United States Patent [19]

Engelbart

[11] Patent Number: 4,923,614
[45] Date of Patent: May 8, 1990

[54] PROCESS AND DEVICE FOR LARGE SURFACE-AREA FINE-BUBBLE GASIFICATION OF LIQUIDS

[76] Inventor: Wilke Engelbart, Welsburg, D-2879 Brettorf, Fed. Rep. of Germany

[21] Appl. No.: 314,577
[22] PCT Filed: Jun. 12, 1987
[86] PCT No.: PCT/DE87/00273
§ 371 Date: Feb. 6, 1989
§ 102(e) Date: Feb. 6, 1989
[87] PCT Pub. No.: WO87/07590
PCT Pub. Date: Dec. 17, 1987

[30] Foreign Application Priority Data

Jun. 12, 1986 [DE] Fed. Rep. of Germany ....... 3619757
Aug. 14, 1986 [DE] Fed. Rep. of Germany ....... 3627665

[51] Int. Cl.$^5$ ............................................. B01D 41/00
[52] U.S. Cl. ....................................... 210/648; 55/16; 55/158; 210/791; 210/321.69; 210/409
[58] Field of Search ............... 210/640, 644, 648, 791, 210/797, 321.69, 391, 409, 410; 55/16, 158

[56] References Cited

U.S. PATENT DOCUMENTS 4,622,148 11/1986 Willinger ........................... 210/460

*Primary Examiner*—Frank Sever
*Attorney, Agent, or Firm*—Fish & Richardson

[57] ABSTRACT

In a method and a device for the widespread fine-bubble aeration of liquids, resilient, perforated membranes, which are preferably in the form of aeration hoses, are arranged in a liquid receptacle and are maintained horizontal by means of holding and guiding devices and are stretched, relative to their rest states, preferably by means of tensioning devices. Because of the stretching, the passage of the gas is improved and a uniform, finely dispersed gas bubble formation is produced. For clearing the perforated membranes of blockages of the perforations, the stretched state of the membranes is briefly released and subsequently again reproduced. For strong impurities, the gas supply is interrupted, the membranes are exhausted of gas and water, the stretched state is subsequently released and, after a predetermined time, gas is again fed into the perforated membranes and then the stretched state is reproduced.

25 Claims, 7 Drawing Sheets

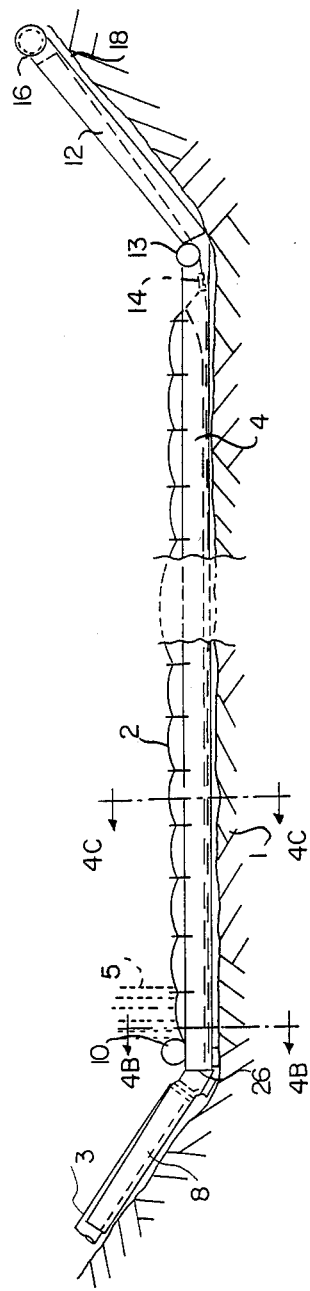
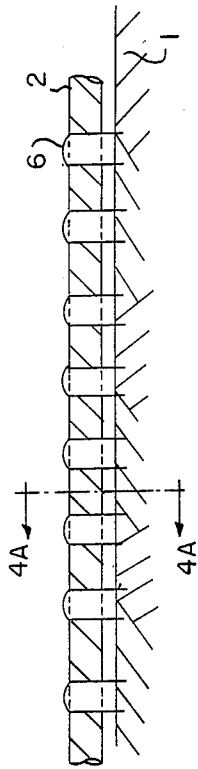
FIG. 1
FIG. 2

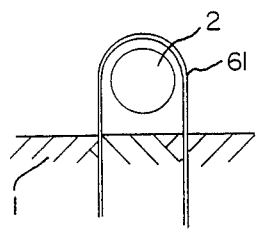
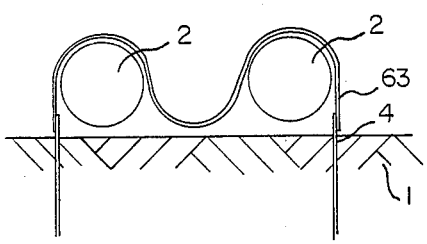
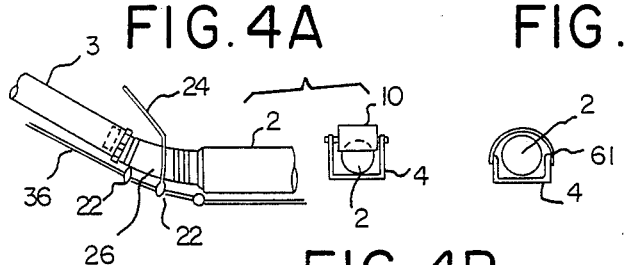
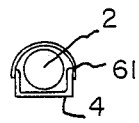
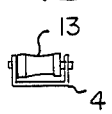
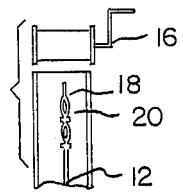

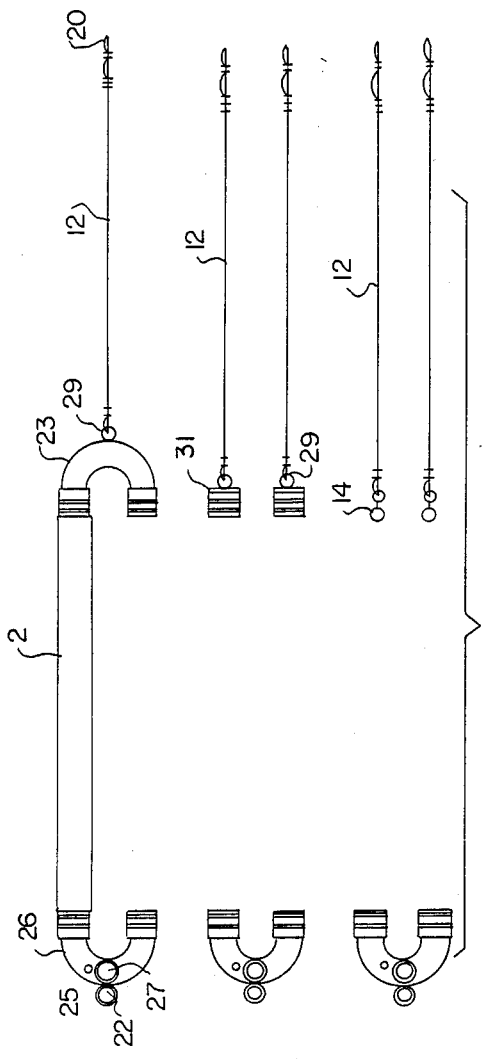

PROCESS AND DEVICE FOR LARGE SURFACE-AREA FINE-BUBBLE GASIFICATION OF LIQUIDS

The present invention relates to a method of and a device for the widespread, finely-bubbled aeration of liquids with a porous or perforated, thin hose- or cushion-like resilient membrane which is clamped at at least two opposite sides and to which a gas is supplied, which passes out from the membrane and into the liquid.

A method and a device of the above type are known from German Patent Number 2,942,607, in which a perforated air distribution sheet is clamped at its edges in a closed frame and is arranged over an unperforated sheet, which is likewise clamped in the frame, so that the perforated sheet, when an air supply is lacking or is low, lies fully against the unperforated sheet. There are arranged both beneath the unperforated sheet and above the perforated sheet crosspieces which are offset from one another and which give the sheets stability. Additionally, the perforated air distributor sheet can be provided at its side facing the unperforated sheet with a glass fiber re-inforced layer as a support member, which gives the perforated support sheet a special stiffness, so that a strong curvature of the perforated air distribution sheet by the air pressure between the crosspieces arranged above the unperforated sheet is also avoided.

In a normal utilization of the prior device for the fine-bubble aeration of water in regeneration ponds of biological filtration plants or for the supply of oxygen in fish breeding ponds or the like, however, problems occur with respect to the uniform gas distribution and a blockage of the perforation openings from the liquid side. A uniform gas distribution depends both on the sizes of the individual through-openings and also on the differential pressure between the interior and the exterior of the air distribution sheet. Due to the dust content of the compressed gas employed, but to a special extent to the blockage of the openings from the liquid side during continuous operation, unavoidable impairments occur with this device and with other devices which, in the course of time, lead to nonuniform bubble formation and/or to an increased pressure loss.

The unavoidable blockages during operation are overcome in the prior devices only to an incomplete extent, so that an increase of the pressure loss, a nonuniform bubble formation or an at least partial interruption of the course of operation for removal and cleaning of the device always has to be taken into account.

With a fine-bubble distribution of the gas in the relevant liquid, a gas distribution which is as uniform as possible with respect to the ground area of the liquid receptacle or parts thereof is additionally desired. If, for this purpose, vent pipes, plates or hoses are arranged at a spacing from one another of a few decimeters, then during operation there results, above the aeration locations, an often undesired fast upstream flow of the liquid-gas bubble mixture, which causes a reduction in the time for which the gas remains in the liquid and also, e.g. during the entry of oxygen from air into water, has as a consequence a substantial reduction of efficiency. The greater the specific charging of the vent device with gas, the lower is the efficiency of the solution of the gas into the respective liquid.

From German Publication (OLS) 3,318,412, there is known a device for applying a gas to a liquid, and in particular to waste water which is to be treated, in which elastomeric, hose-shaped membranes are employed, the walls of which have perforations, through which the gas supplied passes from the interior to the exterior and reaches the surrounding liquid in the form of bubbles. The perforations provided in the walls of the membrane comprise, in that case, transverse slots arranged along the longitudinal axis of the membrane. The hose-shaped membranes were provided on support members.

From German Publication (OLS) 2,757,255 there is known a method of finely distributing liquid substances in gases and/or of gases in liquids in which the substance which is to be finely distributed is supplied under superatmospheric pressure in a perforated support pipe, which is closed at one side, and is passed from there to flexible perforated disks, which are provided at the periphery of the support pipe.

From German Publication (OLS) 3,218,460, it is known to apply hose-like perforated sheets to a flexible support pipe for the fine-bubble aeration of water, the support pipe or rubber covering being formed without perforations in the vicinity of the flexing.

With these prior devices, it is disadvantageous that, during continuous operation, the fine perforations are blocked from the exterior by substances from the surrounding liquid. Because of the associated increase of the pressure loss, i.e. the increase of the pressure difference required for passage of the gas through the perforations, the perforations must be flushed out from time to time with the help of large amounts of gas, i.e. by raising the internal pressure, or with the help of liquids employed instead of gas. For particularly finely perforated vent devices, removal of the entire sheets or vent hoses is additionally required for the purpose of the flushing.

With all membrane-like aeration devices provided on support members, it is crucial that the support member prevents a substantial change of shape, e.g. when the interior pressure is raised.

It is a further disadvantage of the known devices that due to the constructional form of the devices for aerating liquids, only limited areas of the bottom of the receptacle can be covered because, on one hand, the holding devices take up considerable space and therefore prevent a close juxtapositioning of the individual aeration devices and, on the other hand, because of the considerable loss of pressure only limited lengths of the aeration devices can be provided or supply hoses must be provided at predetermined spacings relative to one another to supply the gas into the devices for aerating the liquid.

It is an object of the present invention to provide a method of and a device for the widespread fine-bubble aeration of liquids which ensure a low pressure loss and a uniform, fine-bubble aeration of liquids and which enable any blockages which occur in operation to be overcome without noticeable interruption of the operation and without using a substantially increased internal pressure and which also enable the coverage of areas of any size of the bottom of a receptacle.

According to the invention, this is achieved because the membrane is clamped at at least two opposite sides in holding devices, the membranes are pulled with the help of these holding devices by deflector devices and by guide devices which are arranged in a liquid receptacle and which ensure the horizontal orientation of the membrane, and by variation of the pulling force at at least one holding device the position and/or stretching of the membrane in a longitudinal direction is varied.

The method according to the invention ensures a lower pressure loss and a uniform fine-bubble aeration of the liquid and enables any blockages which occur to be overcome during operation without noticeable interruption of the operation and without utilizing an increased gas pressure and therewith an insufficient aeration of the respective liquid and allows close juxtapositioning of the individual devices so that receptacle bottom surfaces of any sizes can be covered.

In addition, the resilient membrane can selectively be stretched or slackened in the operational condition, so that it is oppositely tautened or released for clearing the perforations of deposits, blockages or the like. The release and stretching of the resilient membrane can be effected either by varying the gas supply while the holding of the membrane remains unaltered or by exerting a pulling force on the resilient membrane at the holding positions while the gas supply remains constant. A combination of both measures to produce the stretched condition is likewise possible.

In an advantageous embodiment of the invention, the hose-shaped resilient membrane is stretched by a predetermined, fixed amount, advantageously by 15% to 25%, in the longitudinal direction relative to its dimensions in the rest condition. By this measure, the pressure loss required for uniform bubble distribution is very substantially reduced.

According to a further embodiment of the invention the gas supply can additionally be interrupted for particularly serious blockages of the perforations, subsequently the stretched condition removed and the gas removed from the interior of the resilient membrane, so that the resilient membrane is compressed by the exterior pressure of the liquid. The compressed gas is subsequently fed in again and the resilient membrane brought to its stretched condition. In this way, even the most stubborn blockages and encrustations of the perforations or porous walls of the resilient membrane are overcome.

Since a plurality of individual aeration assemblies are usually put in operation adjacent one another simultaneously, the brief interruption of a single aeration assembly during this regeneration is practically of no consequence. In order to facilitate the cleaning work in large installations, the individual aeration devices can be alternately connected to two main pipes for the supply of compressed gas, so that during the closing of one main pipe, half of the assembly still remains in operation.

It is a further advantage of the invention that in contrast to the prior art aeration devices, which allow a maximum length dimensions of 1 to 6 meters for a single assembly, since for even greater dimensions a uniform gas distribution can no longer be ensured, by using the method according to the present invention a single assembly can be more than a hundred meters long, without fear of a nonuniform gas distribution. Consequently, the compressed gas supply can be effected from a front side of the receptacle and need not comprise a plurality of separate supply pipes distributed around the entire receptacle.

By the arrangement of a swivel between the holding device and the hose-shaped resilient membrane, even when the resilient membrane is of great length and the hose-shaped resilient membrane is not correctly laid out, it can be ensured that during stretching of the hose-shaped resilient membrane by the tensioning device, no knots are formed and therefore no consequential interruption of the gas supply occurs.

The present invention further enables a receptacle bottom surface to be completely aerated, practically without any gaps, by laying the individual membranes adjacent one another, without any gaps. Such a form of aeration has been found to be advantageous and necessary in many cases and in particular when a so-called static mixer has to be arranged above the aeration device. If, specifically, a part of the intermediate space formed by this static mixer does not have bubbles flowing through it from beneath, then it has in practice been found to be unavoidable that the unaerated intermediate space is blocked by solid material from the liquid. Consequently, for example in the aerobic biological purification of waste water, anaerobic zones are produced in such intermediate spaces, in which poisonous substances can be formed, which can substantially impair the operation or e.g. affect the health of fish.

For a combination of static mixers with the device according to the invention for the fine-bubble aeration of liquids, it has been found to be particulary advantageous that e.g. flat bars are arranged as carrier devices for the mixers over the entire length of the pond at the bottom or vertically above the bottom, which also serve as guides for the individual aeration assemblies, so many perforation positions being present in the membrane of the aeration assembly that there is at least one perforation position beneath each of the chambers formed by the mixers. Such a combination of fine-bubble aeration together with static mixers enables the operation of an assembly to be briefly interrupted without the entire operation being substantially harmed, which is of essential importance for the continous maintenance of the flow relationships in static mixers, since e.g. in the aerobic biological purification of waste water a brief alteration of the operating conditions results in a drastic alteration in the biological growth which forms on the surfaces of the static mixers.

The present invention will be more readily understood from the following description of preferred embodiments thereof given by way of example only with reference to the accompanying drawings, in which:

FIG. 1 shows a diagrammatic view taken in cross-section through a device for the fine-bubble aeration of liquids, which is arranged in a liquid receptacle;

FIG. 2 shows an enlarged representation of the guide device of a aeration hose:

FIGS. 3A and 3B show views taken in section through the arrangement according to FIG. 2 and a modification thereof, respectively;

FIGS. 4A, 4B and 4C show enlarged views of components of the device of FIGS. 1 to 3, taken in cross-section along the lines A—A, B—B and C—C of FIGS. 1 and 2, and FIGS. 4D to 4O show further views of the components of this device;

Figure 5:
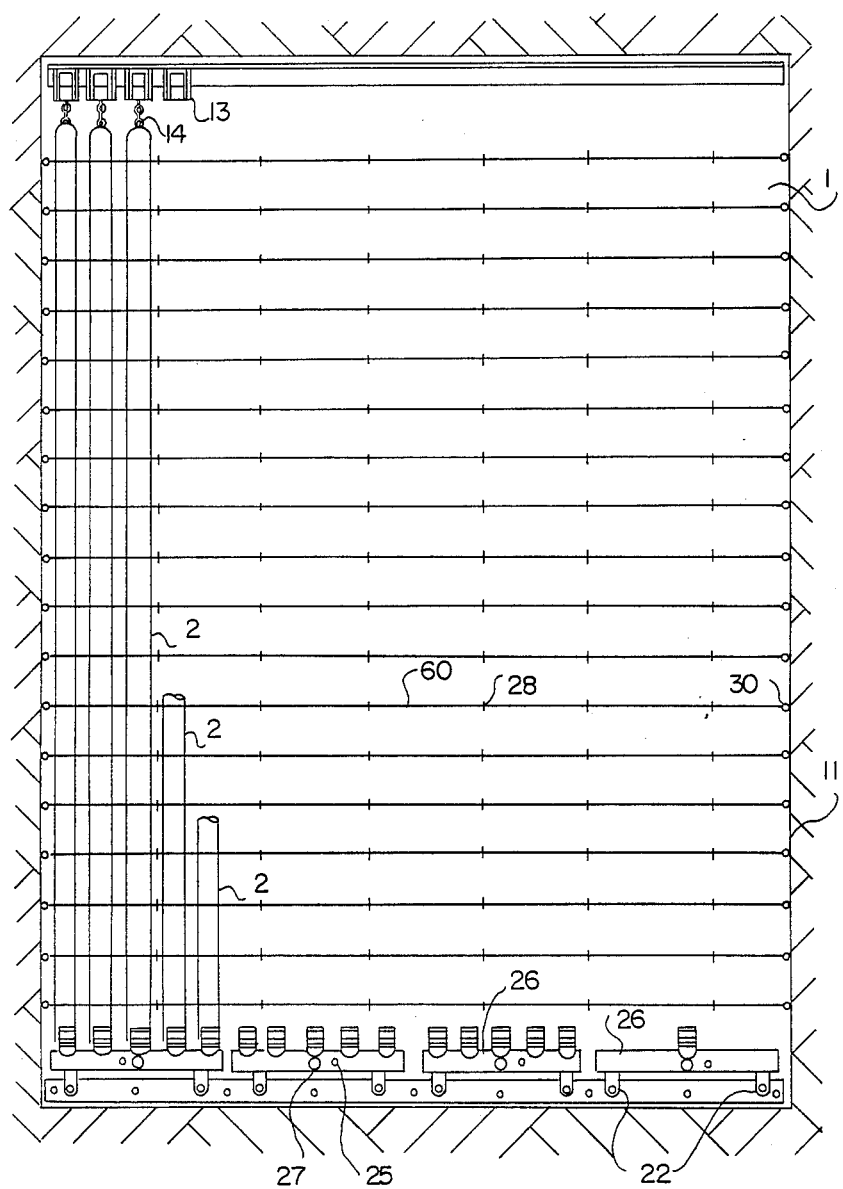
Figure 7:
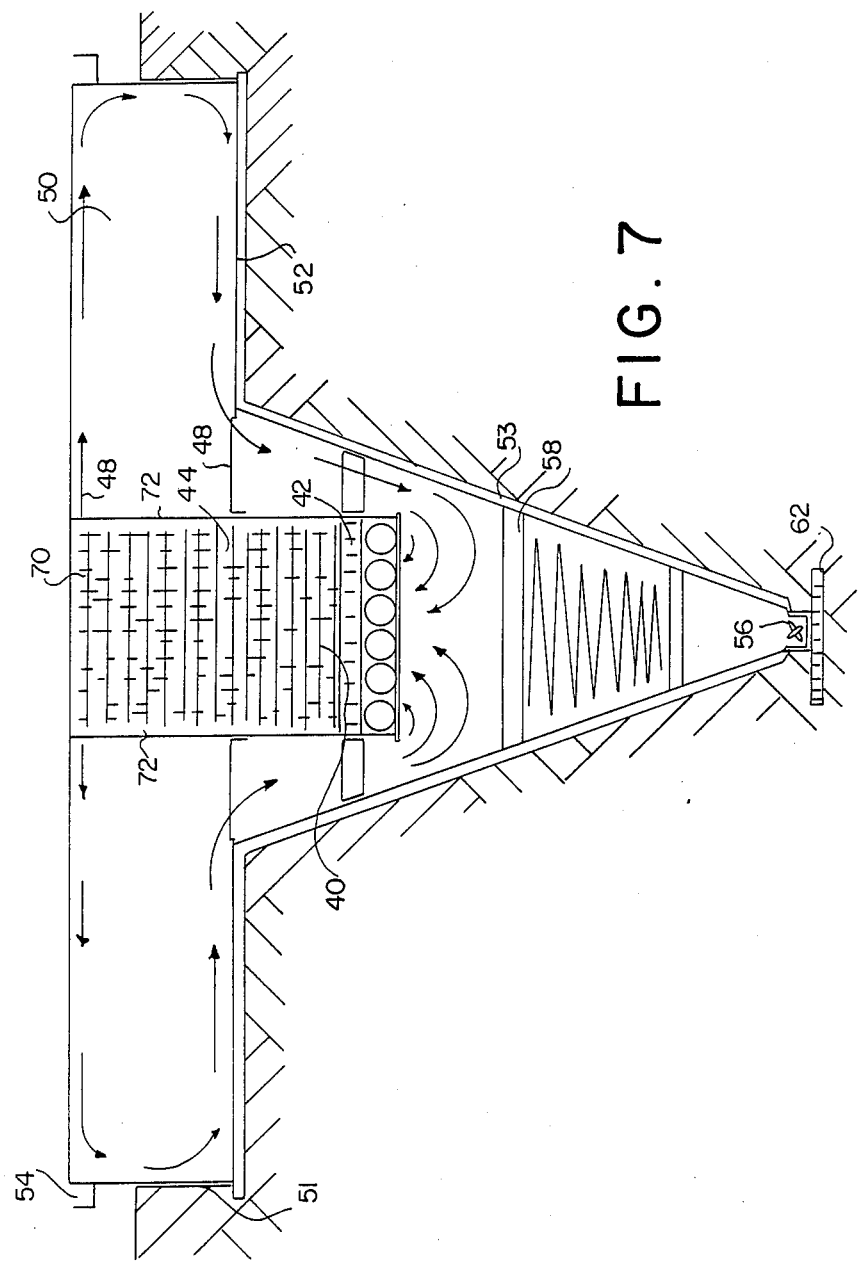
Figure 8:
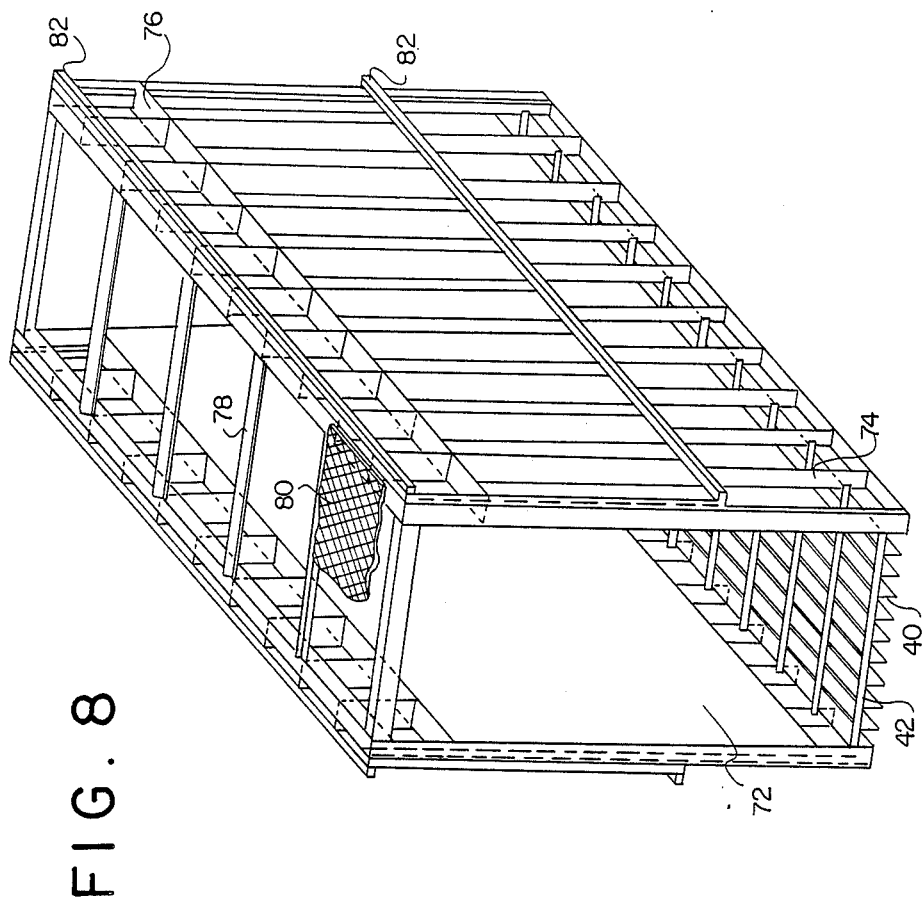

FIG. n5 shows a plan view of a receptacle with several aeration hoses arranged parallel to each other and held by tension cables;

FIG. 6 shows an enlarged view of components of the device of FIG. 5;

FIG. 7 shows a view taken in cross-section through a pond of a fish breeding plant and FIG. 8 shows a view in perspective of a receptacle which can be located in a depression portion of a pond or on a flat bond bottom.

For explaining the function of the device for the fine-bubble aeration of liquids, there is represented in FIG. 1 a cross-section through a liquid receptacle, the receptacle bottom being indicated by reference numeral 1 and the receptacle wall being indicated by reference numeral 11, which when the liquid receptacle is a pond may be the bank of the pond. Approximately parallel to the receptacle bottom and at a small spacing from the receptacle bottom, a vent hose 2 extends over almost the entire length or width of the receptacle bottom 1, the vent hose 2 being laid in a guide channel, for example a U-shaped channel. Curved members 6 are arranged on the guide channels and comprise, for example, curved metal bars which are spaced apart by about 0.2 to 1 m and which prevent the vent hose from floating and maintain it in a horizontal disposition.

In the vicinity of the receptacle wall 11 there is arranged a guide channel 8, which is connected with the guide channel 4. Additionally, at opposite ends of the guide channel 4, rollers 10 and 13 are provided, by means of which the vent hose 2 or the tensioning cable 12 is pulled through a front holding device 14 which, in this embodiment, takes the form of a swivel 14. The tensioning cable 12 may be extended, if required, by means of pulling cables, which are not illustrated, and which can be wound up by means of a winch 16. The tensioning cable 12 has at one of its ends an eye, which is engageable with a hook 18 provided on the receptacle wall.

The rear holding device 26 of the perforated resilient vent hose 2 is connected to a supply hose 3, through which compressed air is fed in the illustrated embodiment as the gas.

Because of the spaced arrangement of the curved members 6 fixed to the guide channel, the upper surface of the vent hose 2 is curved in the manner of cushions during the supply of compressed air through the supply hose 3 and air bubbles 5 leave the vent hose 2 at the perforations and cause a fine-bubble aeration of the water disposed in the receptacle.

In the operational condition, the vent hose 2 is tensioned by the tensioning cable in such a way that the air bubbles leaving the vent hose 2 produce a uniform formation and thus result in a uniform aeration of the water disposed in the receptacle. The stretching of the vent hose 2 in the operational condition preferably amounts to 15% to 25% of its unstretched length, so that a comparatively low tension is exerted on the vent hose 2. If the tensioning or stretching of the vent hose 2 decreases, the tensioning cable 12 can be retightened, so that the required stretched condition is maintained.

If as a consequence of impurities in the compressed air supplied through the supply hose 3 or as a consequence of substances present in the liquid blockages occur in the perforations in the vent hose 2 or if an increased pressure loss occurs because of obstruction of the perforations, then either the tensioning of the vent hose 2 is released by loosening the tensioning cable 12 and the vent hose 2 is brought back to its unstretched length or an increased stretching of the vent hose 2 is effected by tightening of the tensioning cable or by an increased supply of compressed air. When the tensioning of the vent hose 2 is reduced, as a result of the consequential shrinkage the impurities at the perforations in the vent hose 2 are simultaneously released or removed, so that after a brief release of the stretching the operational state can be resumed by the tensioning cable 12 being tightened again and the vent hose 2 thereby being pretensioned by the required amount. During this cleaning operation the supply of compressed air through the supply hose 3 can be interrupted.

Alternatively, removal of the impurities can also be effected by an increased tensioning of the vent hose 2, so that after this cleaning operation the normal operational state of the untensioned or slightly stretched vent hose 2 can be resumed.

If, however, as a result of particularly stubborn blockages of the perforations of the vent hose 2 the desired fine-bubble air bubble distribution formation is not obtained, then it is possible to perform a further attempt at cleaning without removal of the vent hose 2.

For this purpose, the supply of compressed air to the vent hose 2 is firstly interrupted and then in addition the stretched condition can be released as described before. Through an exhaust pipe illustrated in greater detail in the illustration of FIG. 4A, which can be located between the supply hose 3 and the vent hose 2 or at the other end of the vent hose, the compressed air present in the vent hose 2 can leave, so that the vent hose 2 is compressed by the exterior pressure of the liquid disposed in the liquid receptacle. The exhaust pipe is subsequently closed and compressed air is again fed through the supply hose 3 to the vent hose 2. Finally, by tightening of the tensioning cable 12, the operational state of the vent hose 2 can again be instituted.

In the vast majority of cleaning attempts, a uniform fine-bubble aeration of the liquid can subsequently be reestablished, so that removal of the ventilating hose 2 is unnecessary. Removal of the ventilating hose 2 is only necessary, if at all, when the elasticity of the vent hose decreases so that the required fine-bubble air distribution is not obtained.

The removal of the vent hose 2 is, however, very simple because of the constructional arrangement, since the ventilating hose 2 merely has to be removed from the guide device formed by the guide channel 4 and the curved members 6, the tensioning cable, which is extended if necessary, serving to draw a new or cleaned or repaired vent hose 2 between the guide channel 4 and the curved members 6 again.

The detailed view illustrated in FIG. 2 of a vent hose 2 guided along the receptacle bottom 1 shows the curved members 6, which are arranged at equal spacings from one another and which are connected to the receptacle bottom 1 and provide a guide for the vent hose 2. If desired, the curved members 6 may be fixed to a guide channel, for example a U-shaped channel, so that it forms a guide duct for the vent hose 2 in association with the curved members.

In FIGS. 3A and 3B two different embodiments of the guide are shown taken along a section A—A of FIG. 2.

FIG. 3A shows a guide for a single vent hose 2 by means of a curved guide member 61 fixed to the receptacle bottom 2, while FIG. 3B shows two vent hoses 2 retained by means of a W-shaped curved member 63, which is fixed to a channel 4 fixed to the receptacle bottom.

FIG. 4 shows further details of the incorporation of the vent hose 2 in the receptacle illustrated in FIG. 1.

More particularly, FIG. 4A shows in an enlarged scale the connection of the vent hose 2 and the supply hose 3. The connection is formed by means of a holding device 26, on one side of which the supply hose 3 is located and on the other side of which perforated resilient vent hose 2 is located and fixed if necessary by means of additional fixing channels. The holding device 26 has guide rings 22, which are guided by means of guide bars 36. In the holding device there is a water and air removal pipe 24, which preferably includes automatic valves for any water drainage which may be needed.

FIG. 4B is a partial view taken along the line B—B of FIG. 1 showing the vicinity of the rear holding device, the guidance being effected by means of guide roller 10, which is journalled in the U-shaped guide channel 4.

FIG. 4C shows the arrangement of the vent hose 2 in the guide duct formed by the U-shaped guide channel 4 and a curved guide member 61, taken along the line C—C of FIG. 1.

FIG. 4D shows in a detail view the formation and arrangement of the roller 13 for guiding the pulling and tensioning cable 12, the roller 1 being provided, like the roller 10, on the U-shaped guide channel 4.

FIG. 4E shows a detailed view of the securement of the tensioning cable 12 by means of an eye 20, which is engaged with a hook. A winch 16 serves to tension the cable 12.

FIG. 4F shows the assembly and association of the vent hose 2 with the tensioning cable 12 and the holding device 26. In the illustrated embodiment two vent hoses 2 are connected to each holding device 26, which is fixed by means of a ring 22 to a guide bar 36. This rear holding device has a water and air removal opening 25, to which a corresponding water and air removal pipe can be connected. Gas is supplied to the vent hose 2 through a compressed gas opening 27.

The forward holding device 23 is provided with a hook 27, to which a tensioning cable 12 is fixed, the opposite end of which has an eye 20.

Instead of a connection between each pair of vent hoses and a respective forward holding device, appropriate closure-holding devices 31 can be provided, which each have a hook 29 to which a tensioning cable 12, is fixed, which like the previously described embodiment has at its other end an eye which engages a corresponding tensioning hook. Finally, instead of the forward holding device the closed-off vent hose can be connected by a swivel 14 with a respective tensioning cable 12.

The provision of the swivel has proved to be very advantageous both for strongly flowing liquid and also for long lengths of the vent hose 2. During, for example, the replacement of the vent hose 2, the full length of even an unarranged vent hose 2 can thereby be drawn into the guide devices without twisting or knotting first being dealt with. When gas is subsequently fed under pressure to the vent hose 2, then due to the swivel 14 the vent hose 2 is automatically stretched without the risk of forming knots and thereby preventing the distribution of gas within the vent hose 2.

FIG. 4G shows a side view of the holding device 26 which is shown in plan view in FIG. 4F. This side view shows the form of construction of the holding device 26 and the arrangement of the water and air removal pipe 24 and the ring 22 for connection to the guide bar.

FIG. 4H shows a side view of a forward holding device 23 which connects together two adjacent vent hoses 2.

A holding device 31 shown in FIG. 4I serves to connect a single respective vent hose 2 to a corresponding guide bar; which is inserted through the guide ring 22.

FIG. 4K shows a detail view of a swivel 14 for connecting one of the holding devices to its tensioning cable or for indirectly connecting the closed-off end of a vent hose 2 to a tensioning cable 12.

In FIGS. 4L to 4O, further details of the form of construction of the hook 18, which engages the eye formed at one end of the tensioning cable, the roller for taking up and guiding the tensioning cable, the guide bars 36 and the connection of the hook 18 with the eye 20 are illustrated.

The plan view, shown in FIG. 5, of an aeration tank shows a plurality of vent hoses arranged parallel to one another and equally spaced, which are arranged distributed over the tank bottom 1.

In the illustrated embodiment, five vent hoses 2 are connected together at each holding device 26, the individual holding devices 26 distributing compressed air delivered through a supply hose to the respective five vent hoses 2. Next to the compressed air supply opening 27, there is provided a water and air removal opening 25 which serves to remove water and air from the vent hoses 2. The holding devices 26 each have two guide rings 22, which are located around guide bars 36 and can be slid along the guide bars. In this way the parts of the holding device can be drawn downwardly to immediately above the bottom of the tank or to the required spacing above the bottom of the tank or upwardly to the surface of the water.

Rollers 13, over which the tensioning cables (not shown in detail) are drawn, are provided at the opposite ends of the vent hoses 2. Between the rollers 10 and the ends of the vent hoses 2, swivels 14 are provided.

Transverse to the direction of tensioning of the vent hoses 2, guide cables 60 are provided at equal spacings and parallel to one another, which are fixed to the tank wall 11 by means of ring bolts 30. Also, further ring bolts 28 are provided, which are fixed to the tank bottom 1 at equal spacings from one another. The guide cables 60, in association with the ring bolts 30 screwed into the tank wall 11 and the ring bolts 28 screwed into the tankk bottom serve as guide members for guiding the vent hoses 2 and for directing them horizontally.

As can be seen from FIG. 5, there is provided a relatively simple arrangement and application of the vent hoses 2 in the vicinity of the tank bottom for the fine-bubble aeration of the water disposed in the tank. For any replacement of a vent hose which may be necessary, the associated holding device 26 is drawn to the water surface, with the tensioning cable loosened, and the respective vent hose 2 is removed from the holding device 26 and drawn from the tank. Then a new or cleaned vent hose can be attached to the swivel 14 and drawn in. Following this, all of the vent hoses associated with the respective holding device 26 can again be brought into the required state of tension by means of the tensioning cable.

FIG. 6 shows more closely details of the device for guiding and holding the vent hose shown in FIG. 5.

Figure 6A:
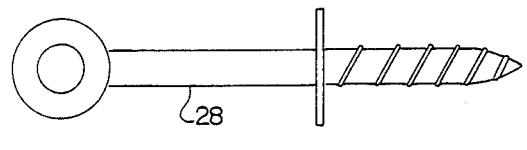
Figure 6B:
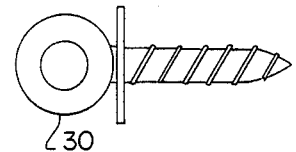

In particular, FIG. 6A shows the form of a ring bolt 28 which is intended to be fixed in the tank bottom, while FIG. 6B shows the embodiment of a ring bolt 30 intended to be fixed in the tank wall, to which the relevant guide cables can be secured. The greater spacing between plates at the bottom of the tank and the eyes for receiving the guide cables, with respect to the spacing of the ring bolt 30 shown in FIG. 6B, serves to hold the guide cable at a certain spacing from the bottom of the tank so that the relevant vent hose or hoses can be drawn beneath.

Figure 6C:
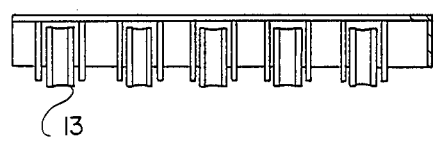
Figure 6D:

FIG. 6C shows a plan view and FIG. 6D shows a side view of the rollers 13 which are used to draw up or wind up the pulling and tension cables and which are fixed to the wall of the tank.

Figure 6E:
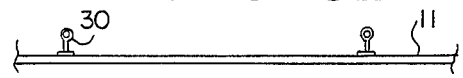

FIG. 6E shows the arrangement of the ring bolts 30 on the edge 11 of the tank.

Figure 6F:
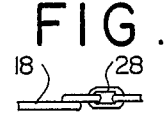

FIG. 6F shows the arrangement of the hooks 18 and the eyes 20 on the ends of the tensioning cables which are fixed to the edge of the tank.

Figure 6G:
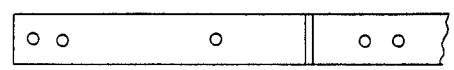
Figure 6H:
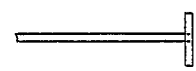

FIG. 6G shows a plan view and FIG. 6H shows a side view of the guide bars 36, which are fixed to a common channel and onto which the guide rings for receiving the holding devices are fitted.

Figure 6I:
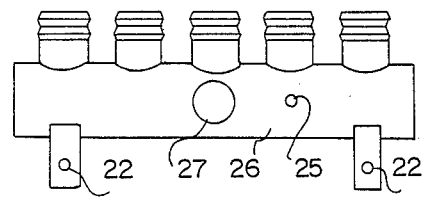

One of the holding devices 26 of FIG. 5 is illustrated in FIG. 6I and has five connector members for attaching five vent hoses. The compressed air supply opening 27 serves to receive the supply hose 3, while the water and air removal opening 24 serves to receive the corresponding water and air removal hoses 24. Two guide rings 22 serve to retain the respective holding device 26.

Figure 6K:
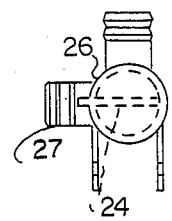

FIG. 6K shows a side view of a holding device according to FIG. 6I.

FIG. 7 shows a cross-section through a fish breeding tank 50, in which a device for the fine-bubble aeration of the water disposed in the fish breeding tank is employed together with a static mixer formed as a container. The fish breeding tank 50 has a substantially horizontal tank bottom 52, which advantageously extends to a ditch-shaped portion, which has inclined tank walls 53. The tank walls 51 provided in the upper part of the fish breeding tank 50 have outlet openings at the height of the water surface, through which the water can flow into a run-off gutter 54. The ditch-shaped portion of the tank bottom is supported on a foundation 62 and has at its lowest, gutter-shaped portion, a clearing chain 56, with the help of which mud deposited in the Vee-shaped depression of the tank is conveyed to one end of the tank, where it can pass or run out. The tank bottom 52 may have a plurality of Vee-shaped depressions.

The device for the fine-bubble aeration of the water disposed in the fish breeding tank is preferably located in the upper third of the Vee-shaped depression of the tank and, like the above-described embodiments, comprises perforated resilient vent hoses 2, which are arranged between vertically arranged guide rods 40. Above the guide rods 40 there are arranged fixing rods 42 extending transversely thereof or sieves, perforated plates or the like, by which the vent hoses 2 are prevented from rising and which, together with the guide rods 40, provide a duct for receiving the vent hoses 2.

Above the fixing rods 42 or sieves, perforated plates or the like, packings 44 are arranged which, together with the aeration device, are accommodated in a container 70 which is closed by lateral container walls 72. The packings 44 are preferably formed as a so-called static mixer, and preferably comprise filler bodies such as those described in German Patent Specification 1,601,131 and together with the vent device and the container provide a mammoth pump effect by which the flows indicated by arrows are created.

Both at the container walls 72, and also at the transition from the substantial horizontally extending tank bottom to the Vee-shaped depression, bars, sieves, perforated plates or the like are employed to prevent the fish located in the fish breeding tank 50 from swimming into the container 70 with the packing 44 or into the Vee-shaped depression portion of the fish tank. The container can be closed at its top by means of bars, sieves, perforated plates or the like and does not need to extend to the liquid surface.

In addition, transverse struts 58 in the depression portion of the tank bottom serve to statically secure the Vee-shaped depression portion, longitudinal extensions of fixing rods 42 extending transverse to the guide rods 40 also serving as bracing and, at the same time, to support the packing 44 or the container 70.

The vent hoses 2, as in the previously described embodiments, are connected at opposite ends to the forward and rear holding devices, through which compressed air is supplied on one hand and the required pretensioning to stretch the vent hoses 2 is produced on the other hand. At the same time, the vent hoses have at least so many perforations that at least one hose perforation is provided under each of the openings which are formed in the vertical direction by the static mixer.

FIG. 8 shows a view in perspective of the container illustrated in FIG. 7 and clarifies its form of construction.

In its lower portion, the container 70 comprises guide rods 40 extending in the longitudinal direction and serving to laterally guide the vent hoses, the guide rods 40 being arranged above the transversely extending fixing rods 42. The fixing rods 42 are connected to the container walls 72, which have vertically extending reinforcement strips 74. The reinforcement strips 74 are connected to one another by means of longitudinal rails 82, and in the upper portion have overflow guide plates 76.

The overflow guide plates 76 may additionally have devices for holding sieves or the like.

The top of the container 70 is formed by bracing rails 78 connecting the container 70 is formed by bracing rails 78 connecting the container walls 72, on which a walkway grating 80 may be laid.

Such a container 70 may be employed both in the deep portion of a fish breeding tank and also on a flat bottom of a tank. Furthermore, a plurality of containers 70 can be arranged behind one another and adjacent one another so that the construction of corresponding plants, composed of the separate components, is made possible.

In the packings 44, loose rubble of sand, pumice, activated carbon, plastic material particles and the like can be provided, which have the largest possible surface area for accommodating a so-called biological growth or e.g. surface-fixed catalysts.

The embodiments of the invention in which an exclusive property or privilege is claimed are defined as follows:

1. A method for the widespread, fine-bubble aeration of liquids employing a porous or perforated, support-free resilient membrane to which a gas is supplied, which passes out from the membrane and into the liquid, comprising the steps of:

providing holding devices and deflector devices
holding said membrane at at least two opposite sides in holding devices:
strectching said membrane (2) with the help of said holding devices by said deflector devices (10) and guide devices which are provided in said a liquid receptacle and which maintain said membrane (2) horizontal; and
varying the position and/or the stretched state of said membrane (2) by varying the pulling force at at least one of said holding devices.

2. A method according to claim 1, wherein said resilient membrane (2) is in the form of a hose and comprises a permanently resilient plastic material, rubber or the like having a wall thickness less than 2 mm., preferably less than 0.5 mm.

3. A method according to claim 1, which includes varying the stretched state of said resilient membrane (2) in the transverse direction, while the holding of the resilient membrane in the longitudinal direction remains stationary, by increasing, reducing or interrupting the gas supply thereto.

4. A method according to claim 1, 2 or 3, which includes stretching said resilient membrane (2) in its operational state in the longitudinal direction by a predetermined fixed amount, preferably by 5 to 25% with respect to its dimensions in its rest condition.

5. A method according to claim 1 or 4, which includes
feeding gas under increased pressure and/or exerting a pull on said resilient membrane (2) to stretch said resilient membrane (2) for cleaning while said resilient membrane (2) is slackened in the longitudinal direction in the operational state; and
subsequently bringing the gas supply to a value corresponding to the operational state and/or reducing or releasing the pulling force exerted on said resilient membrane (2).

6. A method according to claim 1, which includes effecting the stretching of said resilient membrane (2) in the longitudinal direction in dependence on the gas pressure at one side of said resilient membrane (2).

7. A method according to claim 6, which includes effecting the stretching of said resilient membrane (2) in the longitudinal direction in dependence on the difference between the gas pressure on one side of said resilient membrane (2) and the liquid pressure at the other side of said resilient membrane (2).

8. A method according to claim 6 or 7, which includes
draining residual gas and liquid located in the interior of said membrane through a water and gas removal pipe (24) with the gas supply interrupted for cleaning while said resilient membrane (2) is stretched in the longitudinal direction in the operational state;
releasing the stretching of said resilient membrane (2) in the longitudinal direction;
stretching said resilient membrane (2) again after a predetermined time; and
subsequently feeding gas again into said resilient membrane (2).

9. A method according to claim 6 or 7, which includes
draining residual gas and liquid located in the interior of said membrane through a water and gas removal pipe (24) with the gas supply interrupted for cleaning while said resilient membrane (2) is slackened in the longitudinal direction in the operational state;
stretching said resilient membrane (2) in the longitudinal direction;
again slackening said resilient membrane (2) in the longitudinal direction; and
subsequently bringing the gas supply back again to a value corresponding to the operational state.

10. A device for the widespread fine-bubble aeration of liquids, comprising:
a porous or perforated, support-free resilient membrane to which gas is supplied which passes out from the resilient membrane and into the liquid;
guide devices (61 60) horizontally directed in a liquid receptacle;
means for holding said resilient membrane (2) at least two opposite sides in holding devices (12, 14, 16, 18, 20), of which the spacing from one another is variable by variation of the stretched state of said resilient membrane (2); and
means for enabling said resilient membrane (2) to be drawn with the help of said holding devices (12, 14, 16, 18, 20) through said guide devices (6; 60).

11. A device according to claim 10, wherein said resilient membrane (2) is connected to means (3) for supplying a gas thereto and to means (24) for removing gas and liquid therefrom.

12. A device according to claim 10 or 11, wherein a swivel (14) is arranged between said resilient membrane (2) or said vent hose/s (2) and said holding device (12, 14, 16, 18, 20).

13. A device according to claim 10, wherein said resilient membrane (2) is closed and is arranged in the vicinity of the bottom of said liquid receptacle, and wherein at least a portion of the top of said resilient membrane (2) facing towards the surface of said liquid is perforated, and preferably perforated, slit or provided with crossed slits or porous.

14. A device according to claim 13, wherein means are provided in the interior of said resilient membrane (2) for measuring the gas pressure and wherein means are provided for varying, through said holding devices (12, 14, 16, 18, 20), the extent of the stretching in dependence on the gas pressure.

15. A device according to claim 10, wherein said resilient membrane (2) comprises at least one porous or perforated vent hose (2), which by means of said guide devices is held parallel to the surface of the liquid and wherein said guide devices comprise weights of variable shape fixed to the underside of the porous or perforated hose (2).

16. A device according to claim 15, wherein said guide devices comprise anchoring devices arranged transverse to the longitudinal direction of the vent hose or hoses (2), beneath which said vent hose/s (2) is/are freely movable.

17. A device according to claim 16, wherein said anchoring devices comprise curved securing members (6, 61, 63) connected with securing channels (4) and extending at predetermined spacings from one another around the vent hose/s (2), said securing rails extending parallel to said vent hose/s and fixed at the bottom (1) or wall of said receptacle or in a container serving as guide rails.

18. A device according to claim 16, wherein said anchoring devices comprise tension cables (60) extending transverse to the longitudinal direction of said vent hose/s (2) and secured by means of ring bolts to opposite sides (11) of said tank and arranged at a spacing from the bottom of said tank by means of further bolts (28).

19. A device according to claim 10, wherein deflector devices (10) are arranged in the vicinity of the wall (11) of said receptacle, by means of which the vent hose/s can be lowered into said liquid receptacle or removed from said receptacle.

20. A device according to claim 10, wherein said vent hose/s is/are arranged between vertically arranged guide rods (40) extending parallel to said vent hose/s and wherein securing rods (42) are arranged extending above the guide rods (40) and transverse to the guide rods (40) and form, together with said guide rods (40), a duct or ducts for receiving said vent hose/s (2), said guide rods (40) and said securing rods (42) forming the underside of a container (70), which is laterally closed by container walls (72) and in which packings (44) are arranged as static mixers.

21. A device according to claim 20, wherein said vent hose/s (2) has/have at least so many perforations that under each opening formed by the static mixer in the vertical direction there is provided at least one perforation.

22. A device according to claim 20, wherein sieves, perforated plates (71) or the like are arranged above said vent hose/s (2) and said packings (44).

23. A device according to claim 20, wherein said container walls (72) comprise sieves, perforated plates or the like, at least in the vicinity of the tank bottom (52).

24. A device according to claim 20, wherein loose filler materials such as sand, activated carbon, pumice, plastic material, granulated material or the like are provided in said packings (44).

25. A device according to claim 24, wherein said filler materials are so arranged above one another that the bands or channels forming the filler materials have different directions over one another such that the lower edges of the bands of one filler material location subtend angles with the upper edges of the underlying filling material bands, the channels of a lower filler material location being separated, as viewed vertically, from the edges of the bands of the overlying filler material location.

* * * * *